(12) United States Patent
Monteil (10) Patent No.: US 10,107,427 B2
(45) Date of Patent: Oct. 23, 2018

(54) SECURED IN PLACE GASKET FOR SEALING PLASTIC PIPELINES, METHOD OF MANUFACTURE AND METHOD OF INSTALLATION

(71) Applicant: S & B Technical Products, Inc., Fort Worth, TX (US)

(72) Inventor: Guillermo Monteil, San Jose, CA (US)

(73) Assignee: S & B Technical Products, Inc., Fort Worth, TX (US)

( * ) Notice: Subject to any disclaimer, the term of this patent is extended or adjusted under 35 U.S.C. 154(b) by 86 days.

(21) Appl. No.: 15/092,174

(22) Filed: Apr. 6, 2016

(65) Prior Publication Data

US 2016/0245436 A1    Aug. 25, 2016

Related U.S. Application Data

(62) Division of application No. 13/923,468, filed on Jun. 21, 2013, now abandoned.

(51) Int. Cl.
*F16L 47/08* (2006.01)
*F16L 21/03* (2006.01)
(Continued)

(52) U.S. Cl.
CPC .......... *F16L 21/03* (2013.01); *B29C 45/1459* (2013.01); *F16J 15/022* (2013.01);
(Continued)

(58) Field of Classification Search
CPC .......... B29L 2031/265; B29K 2701/12; B29K 2071/00; F16L 37/091; F16L 37/0845;
(Continued)

(56) References Cited

U.S. PATENT DOCUMENTS 4,572,523 A * 2/1986 Guettouche .......... F16L 17/035
                                                        277/616
4,693,483 A    9/1987 Valls
(Continued)

FOREIGN PATENT DOCUMENTS

EP    1571386 A2    9/2005
EP    1619435 A1    1/2006
(Continued)

OTHER PUBLICATIONS

Trelleborg, Forsheda 601 Power Lock (TM) product brochure webpages, 2 pages, Jan. 2011; www.Trelleborg.com.
(Continued)

*Primary Examiner* — Jacob Cigna
*Assistant Examiner* — Lee A Holly
(74) *Attorney, Agent, or Firm* — Whitaker Chalk Swindle & Schwartz PLLC; Charles Gunter (57) ABSTRACT

A pipe sealing gasket is shown which is designed to be received within a raceway provided within a socket end of a female bell plastic pipe end which is assembled with a mating male pipe end to form a plastic pipe joint. The raceway in the female bell plastic pipe end is preformed during manufacture and the gasket is installed thereafter. The gasket has a rubber body portion which is reinforced by a hard plastic band formed as a series of integral, spaced wedges which are interconnected by a flexible ribbon. The hard plastic band acts to prevent extrusion of the gasket during a variety of pressure conditions as well as preventing displacement during field assembly.

10 Claims, 9 Drawing Sheets

(51) Int. Cl.
*B29C 45/14* (2006.01)
*F16J 15/02* (2006.01)
*F16L 17/025* (2006.01)
*F16L 17/035* (2006.01)
*F16L 37/084* (2006.01)
*F16L 37/091* (2006.01)
*B29K 701/12* (2006.01)
*B29L 31/26* (2006.01)
*B29K 21/00* (2006.01)
*B29K 71/00* (2006.01)

(52) U.S. Cl.
CPC ........... *F16L 17/025* (2013.01); *F16L 17/035* (2013.01); *F16L 37/0845* (2013.01); *F16L 37/091* (2013.01); *F16L 47/08* (2013.01); *B29C 45/14631* (2013.01); *B29K 2021/00* (2013.01); *B29K 2071/00* (2013.01); *B29K 2701/12* (2013.01); *B29L 2031/265* (2013.01)

(58) Field of Classification Search
CPC ....... F16L 17/035; F16L 17/025; F16L 21/03; F16L 47/08; F16J 15/022; B29C 45/1459; B29C 45/14631
See application file for complete search history.

(56) References Cited

U.S. PATENT DOCUMENTS

| | | | |
|---|---|---|---|
| 4,818,209 A | 4/1989 | Petersson et al. | |
| 4,834,398 A | 5/1989 | Guzowski et al. | |
| 4,834,430 A | 5/1989 | Vassallo et al. | |
| 5,067,751 A | 11/1991 | Walworth et al. | |
| D330,073 S | 10/1992 | Valls | |
| 5,213,339 A | 5/1993 | Walworth | |
| 5,295,697 A | 3/1994 | Weber et al. | |
| 5,695,201 A | 12/1997 | Wheeler | |
| 5,988,695 A | 11/1999 | Corbett, Jr. | |
| 6,044,539 A | 4/2000 | Guzowski | |
| 6,142,484 A | 11/2000 | Valls, Jr. | |
| 6,328,309 B1 | 12/2001 | Corbett, Jr. | |
| 7,252,293 B2 * | 8/2007 | Happel | F16L 21/03 277/575 |
| 7,731,884 B2 | 6/2010 | Knapp et al. | |
| 7,815,225 B2 | 10/2010 | Jones et al. | |
| 2005/0046189 A1 | 3/2005 | Corbett, Jr. et al. | |
| 2006/0125193 A1 | 6/2006 | Corbett, Jr. et al. | |
| 2007/0290455 A1 | 12/2007 | Knapp et al. | |
| 2010/0059940 A1 * | 3/2010 | Monteil | F16L 21/03 277/314 |
| 2012/0228836 A1 | 9/2012 | Holmes, IV et al. | |
| 2013/0125367 A1 | 5/2013 | Rode et al. | |

FOREIGN PATENT DOCUMENTS

| | | |
|---|---|---|
| EP | 14813593.2 | 1/2017 |
| WO | PCT/US14/37487 | 11/2014 |

OTHER PUBLICATIONS

Trelleborg, Forsheda 576 Anger-Lock (TM) product brochure webpages, 2 pages, Jan. 2011; www.Trelleborg.com.

* cited by examiner

SECURED IN PLACE GASKET FOR SEALING PLASTIC PIPELINES, METHOD OF MANUFACTURE AND METHOD OF INSTALLATION

CROSS REFERENCE TO RELATED APPLICATIONS

The present application is a divisional application of prior filed Ser. No. 13/923,468, filed Jun. 21, 2013, entitled "Secured In Place Gasket For Sealing Plastic Pipelines, Method of Manufacture and Method of Installation", by the same inventor.

BACKGROUND OF THE INVENTION

1. Field of the Invention

The present invention relates generally to sealing gaskets and sealing systems used for pipe joints in plastic pipelines in which a male spigot pipe section is installed within a mating female socket pipe section to form a pipe joint and, more specifically, to an improved gasket, simplified method of manufacture, as well as an installation method for installing a locked-in gasket within a preformed gasket groove in a section of pipe used to form a pipe joint.

2. Description of the Prior Art

Fluid sealing systems for plastic, fluid conveying pipes are used in a variety of industries. The pipes used in such systems are typically formed from thermoplastic materials including polyolefins and PVC. In forming a joint between sections of pipe, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the major seal capacity for the joint. Various types of sealing technologies have been employed to assure the sealing integrity of the pipe joint. It is important that the sealing gasket not be dislodged during the joint make up and that the gasket not become twisted or otherwise compromised in field applications. It is also important that the gasket not extrude out of the pipe groove under various pressure conditions.

Earlier gasketed sealing systems are known in which a homogeneous rubber gasket was generally deformable, allowing it to be flexed, or bent by hand, accepting inverse curvature, and inserted within a mating internal raceway formed in the female, belled pipe end. The raceway in the female pipe bell end was pre-formed using a collapsible mandrel belling tool at the pipe manufacturing facility. A prior art attempt to insure the integrity of such pipe joints involved the use of a pipe gasket having a first distinct body region formed of an elastically yieldable sealing material, such as rubber, bonded to a second distinct body region formed of a more rigid material, such as a rigid plastic. The intent was that the rigid body region of the gasket would assist in holding the gasket in place within the pipe groove. Other approaches to the problem included the use of a homogeneous rubber ring with a stiffening band which was inserted into a mating groove provided on the internal diameter of the rubber ring. In the other prior art systems, a homogeneous rubber gasket body was bonded with an internal or external metal, or plastic, reinforcing band or an internal metal band or ring. Each of these solutions had critical limitations. For example, the prior art plastic/rubber composites sometimes allowed the infiltration of dirt and debris between the bell raceway and the outer diameter of the gasket. The plastic region in some cases, reduced the rubber surface contact area, sometimes leading to problems in providing the needed sealing in all conditions, including high pressure, low pressure and cyclic surges. Compatible materials were necessary when bonding the homogeneous rubber gasket body with the plastic reinforcing band. Poor bonding resulted in separation of the two elements. The reinforcing band was subject to being misplaced and breakage in the two part system. Thus, in some cases, the prior art solutions failed to provide the needed joint integrity, often contributing to the complexity and expense of the manufacturing operation and field installation.

In the early 1970's, a new technology was developed by Rieber & Son of Bergen, Norway, referred to in the industry as the "Rieber Joint." The Rieber system employed a combined mould element and sealing ring for sealing a joint between the socket end and spigot end of two cooperating pipes formed from thermoplastic materials. In the Richer process, an elastomeric gasket was installed within an internal groove in the socket end of the female pipe as the female or belled end was simultaneously being formed. Rather than utilizing a preformed groove, the Rieber process provided a prestressed and anchored elastomeric gasket during the belling operation. Because the gasket was installed simultaneously with the formation of the belled pipe end, a rigid, embedded reinforcing ring could be supplied as a part of the gasket. Because the pipe groove was, in a sense, formed around the gasket with its embedded reinforcing ring, the gasket was securely retained in position and did not tend to twist or flip or otherwise allow impurities to enter the sealing zones of the joint, thus increasing the reliability of the joint and decreasing the risk of leaks or possible failure due to abrasion. The Richer process is described in the following issued United States patents, among others: U.S. Pat. Nos. 4,120,521; 4,061,459; 4,030,872; 3,965,715; 3,929,958; 3,887,992; 3,884,612; and 3,776,682.

Despite the advances offered by the Richer process, the belling operation was somewhat complicated and costly. Also, certain situations exist in which it would be desirable to manually remove one gasket and reinstall another within a preformed raceway in the selected pipe end, rather than utilizing an integrally installed gasket in which the groove in the pipe is formed around the gasket. For example, municipal and consulting engineers will specify specialty elastomers based on the pipelines end-use and soil conditions. While SBR is the most common rubber used in North America, engineers will specify EPDM based on water treatment technique, and nitrile rubber when there is hydrocarbon soil contamination due to gasoline or oil pollution. Distributors and contractors cannot exchange Rieber process gaskets in their pipe inventory.

It would therefore be advantageous to be able to install a gasket of the type having a reinforcing element within a previously belled pipe end, as opposed to those systems like the Richer systems, where the female pipe end is formed about the sealing gasket during the manufacture of the female pipe end. However, prior art gaskets with reinforcing elements are subject to breakage and are not easily bent or flexed by hand, thus generally precluding hand assembly in the field. The size and position of the reinforcing element, which is bonded to the gasket body, generally was greater than the diameter of the mouth opening of the belled pipe end, presenting a further complication for assembly.

U.S. Pat. No. 6,044,539, issued Apr. 4, 2000, to Guzowski, and commonly owned by the present applicant describes a machine for inserting a "snap-fit" gasket, unable to accept inverse curvature, having an embedded reinforcing ring into a preformed gasket receiving groove in a belled pipe end. However, such a machine was fairly costly to construct and presented difficulties in being hand carried by a worker in the field.

The present invention has, as one object, to provide an improved pipe gasket for use in pipe joints which offers the advantage of a Rieber type seal, while allowing the gasket to accept inverse curvature, to be installed in a preformed groove by hand, either at the manufacturing plant or in a field operation.

Another object of the invention is to provide an improved gasket which is securely retained within a preformed pipe groove without the necessity of a separate retaining band.

Another object of the invention is to provide an improved sealing gasket of the plastic/rubber variety which optimizes the rubber sealing surface contact of the gasket with the pipe bell raceway.

Another object of the invention is to provide a reinforcing element that is not required to be bonded to the rubber element, hence creating the possibility of being made from a multitude of materials.

Another object of the invention is to provide such a sealing gasket with special reinforcing attributes which allow it to seal under a variety of pressure conditions without being twisted or extruded, or displaced during field assembly, and yet which can be installed by hand in the bell raceway.

SUMMARY OF THE INVENTION

The sealing gasket of the invention is a rubber/plastic secured-in design which is especially useful in sealing PVC pipes having bell ends made using collapsible mandrel tools. The gasket is reinforced with a reinforcing element, or band, comprised of a series of wedges which are interconnected by a flexible ribbon. The band is preferably imbedded within the rubber body portion of the gasket, avoiding the use of bonding elements. The rubber element of the gasket provides the primary sealing capacity while the plastic element improves resistance to extrusion due to water pressure and displacement during field assembly.

The gasket accepts inverse curvature to allow easy installation in a pre-formed pipe bell raceway by hand. Once the gasket is installed, it works as a combined compression and lip seal. It is preferably installed by the PVC pipe manufacturer and, once installed, is a secured part of the pipe. The rubber portion of the gasket can be, for example, SBR, EPDM, NR, etc., combined with a hard plastic band.

In its preferred form, a pipe sealing gasket is shown which is designed for receipt within a groove provided within a female socket end of a thermoplastic pipe, the female socket end being designed to receive a mating male thermoplastic pipe end to form a pipe joint. The gasket comprises a ring shaped elastomeric body having a main body portion formed of rubber which, when viewed in cross section, includes a leading nose region, a lower compression region and a trailing tail region. The leading nose region faces generally towards the female socket end of the pipe once the gasket is inserted within the pipe.

The leading nose region of the main body portion of the gasket is reinforced by a hard plastic band comprised of a series of wedges interconnected by a flexible ribbon, the hard plastic band being embedded within the leading nose region of the main body portion of the gasket during gasket manufacture. In use, the wedges spaced along the ribbon act to prevent extrusion and displacement of the gasket from the raceway provided in the female socket end of the thermoplastic pipe. The main body portion of the gasket can conveniently be formed of a natural or synthetic rubber, for example, styrene butadiene rubber, ethylene propylene diene monomer rubber and nitrile rubber. The hard plastic ribbon is formed of a synthetic plastic material having a durometer which is greater than the durometer of the main body portion of the gasket. The material is selected based upon its having sufficient rigidity to prevent extrusion and displacement in use, while being flexible enough to allow the gasket to accept inverse curvature during installation. The material chosen must also not be so rigid as to break while being flexed or bent.

The lower compression region of the gasket can be provided with a series of circumferential engagement ribs for engaging the mating male spigot pipe end. The main gasket body has an outer bulbous region which can similarly be provided with a series of circumferential engagement ribs for engaging the female socket end of the pipe. Preferably, the main gasket body has a lower, primary sealing surface which forms a combination lip and compression seal region for the gasket. The "lip" region is separated from the convex sealing surface and trailing tail portion of the gasket body by a V-shaped recess. The V-shaped recess allows the lip region of the gasket body to bend inwardly as the mating male, spigot end of a mating pipe section encounters the primary sealing surface of the gasket.

A method is also shown for manufacturing a sealing pipe gasket designed for receipt within a bell pipe groove provided within a socket end of a female pipe member, whereby fitting the gasket within the groove allows a mating male pipe having a spigot pipe end to be inserted therein to form a continuous pipe joint. The method includes providing a mold having a first mold face with a circumferential recess. A hard plastic reinforcing element, the band, is placed within the circumferential recess in the first mold face, the hard plastic band being formed as a series of wedges interconnected by a flexible ribbon. The wedges each have a front edge, a rear edge and opposing side edges, as viewed in cross section, and wherein the opposing side edges slope evenly from the rear edges to the front edges thereof.

A second mating mold face is provided which is then united with the first, mold face, with a rubber compound being injected into the mold recess. Heat and pressure are applied to the mold to form a ring shaped elastomeric body having a main body portion formed of rubber which, when viewed in cross section, includes a leading nose region, a lower compression region and a trailing tail region. The main body portion of the gasket is then cured with the hard plastic ribbon contained therein, whereby the leading nose region of the main body portion of the gasket is reinforced by the hard plastic ribbon.

The gasket of the invention, while being, reinforced by the hard plastic ribbon, is nevertheless flexible enough to allow the ribbon to be bent at an oblique angle for insertion within the mating bell groove provided in the female socket pipe end. The gasket then returns to a generally cylindrical shape and is secured-in within the bell socket groove by the action of the hard plastic ribbon.

Additional objects, features and advantages will be apparent in the written description which follows.

DETAILED DESCRIPTION OF THE INVENTION

Figure 1:
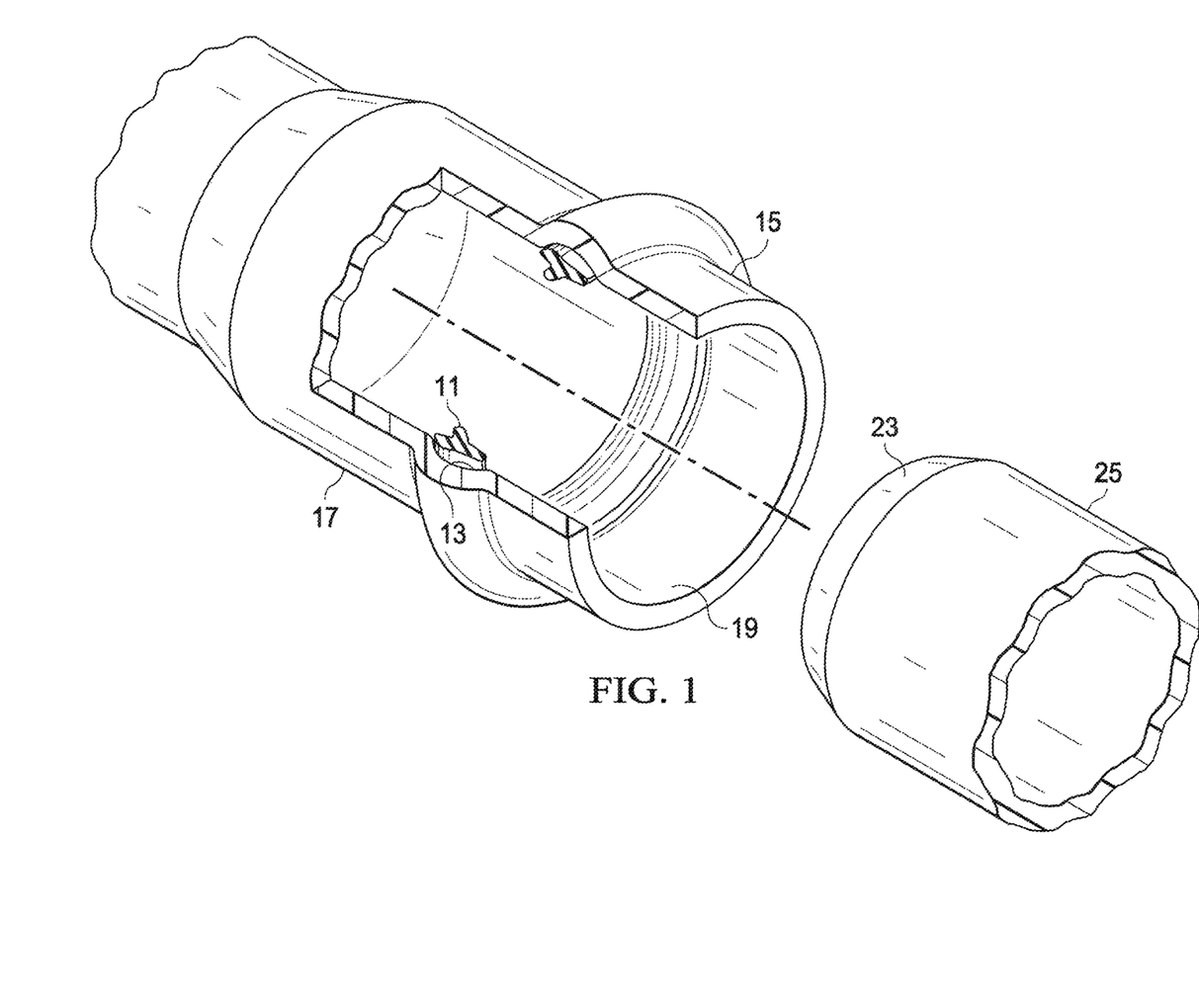
FIG. 1 is an end view of a section of plastic pipe, partly broken away, and showing the bell end and raceway, with a gasket, of the invention in place in the raceway, the male pipe section being position for insertion into the bell.

Turning now to the attached illustrations, FIG. 1 shows the gasket 11 of the invention in place prior to the assembly of a pipe joint. The gasket 11 is installed within a raceway 13 provided within the belled end 15 of a female pipe section of thermoplastic pipe 17. The female pipe section 17 can be formed of any of a variety of commercially available thermoplastic materials, such as the polyolefin family including polyethylene and polypropylene as well as polyvinyl chloride and similar materials. Thermoplastic pipes of this general type are used in a variety of industrial settings including water, sewage and chemical industries. The belled end 15 of the thermoplastic pipe section has a mouth opening 19 which is engageable with a spigot end 23 of a mating male pipe section 25 to form a pipe joint. The gasket receiving raceway 13 has been pre-formed in the pipe mouth opening 19 at the pipe manufacturing facility, as by using a collapsible mandrel belling tool. The raceway 13 is generally arcuate as viewed in cross section with a forwardly facing slope region (32 in FIG. 7).

Figure 2:
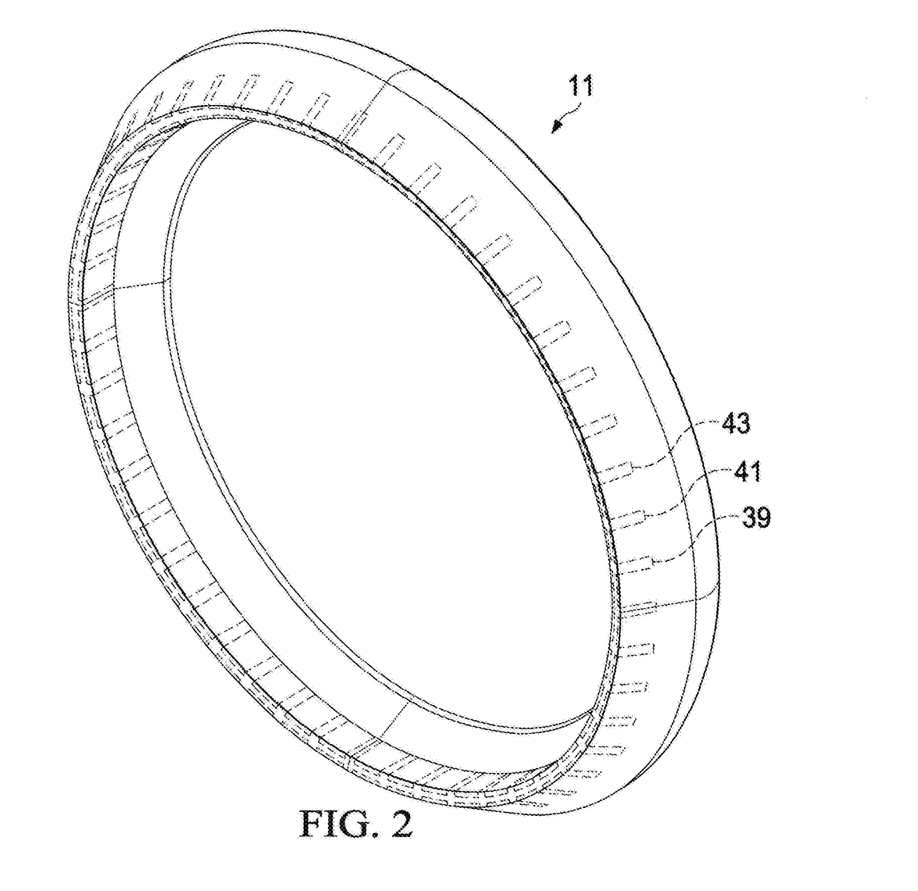
FIG. 2 is a perspective view of the sealing gasket of the invention, showing the hard plastic band with its wedges and associated flexible ribbon in dotted lines.
Figure 7:
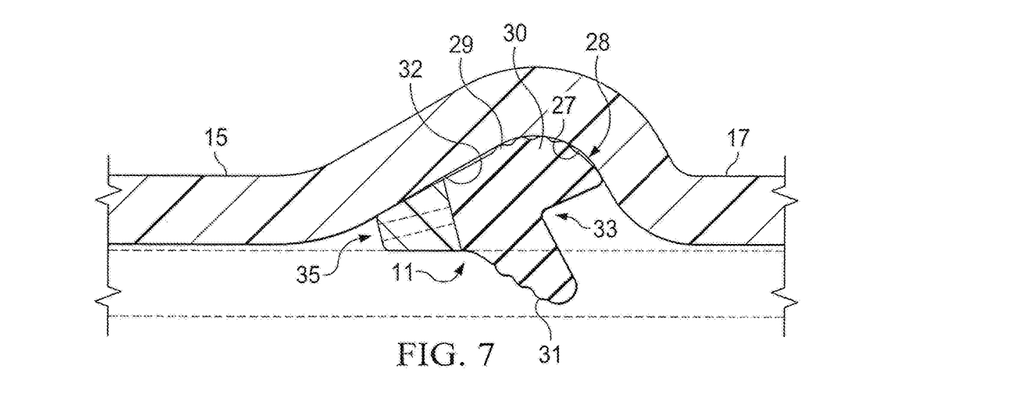
FIG. 7 is a side, partial cross sectional view of the gasket of the invention in place in the internal groove provided in the female bell socket pipe end, the direction of travel of the mating male pipe member being shown in dotted lines.

A particularly preferred form of the gasket 11 which can be used in the method of the invention is shown in profile in FIG. 2 and in cross-section in FIG. 7. Preferably, the gasket 13 is an annular, ring-shaped member having a main gasket body 28 formed of a flexible elastomeric material, such as a suitable natural or synthetic rubber. The elastomeric material used to form the body 28 of the gasket will vary in composition depending upon the end application but may encompass a number of different natural and synthetic rubbers including, for example, styrene butadiene rubber (SBR), ethylene propylene diene rubber (EPDM), acrylonitrile-butadiene rubber (NBR), nitrite rubber, etc.

Figure 10:
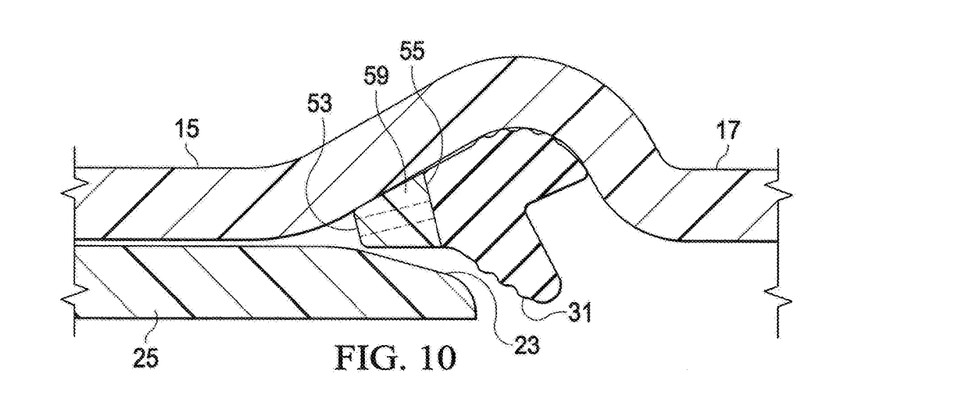
FIG. 10 shows the beginning step of the make up of a pipe joint with the male pipe end just beginning to make contact with the sealing gasket of the invention

Turning now to FIG. 7, the main gasket body 28 includes an outer convex sealing surface 27 which, in this case, is provided with a series of ribs or serrations 29. The main gasket body also includes a lower, primary sealing surface 31. In the preferred embodiment shown, the primary sealing surface 31 is an evenly sloping face of the gasket body which forms a combination lip and compression seal region for the gasket. The lip region is separated from the outer convex sealing surface 27 and trailing tail portion 30 by a V-shaped recess (shown generally as 33 in FIG. 7). The V-shaped recess allows the lip region of the gasket body to bend inwardly as the mating male, spigot end of a mating pipe section encounters the primary sealing surface 31 of the gasket (see FIGS. 10-12).

Returning to FIG. 7, the main gasket body 28 also has a leading nose region, designated generally as 35 in FIG. 7 which is initially contacted by the mating male spigot pipe end during the assembly of the pipe joint. The leading nose region 35 faces generally towards the female socket end of the pipe once the gasket is inserted within the pipe.

Figure 8:
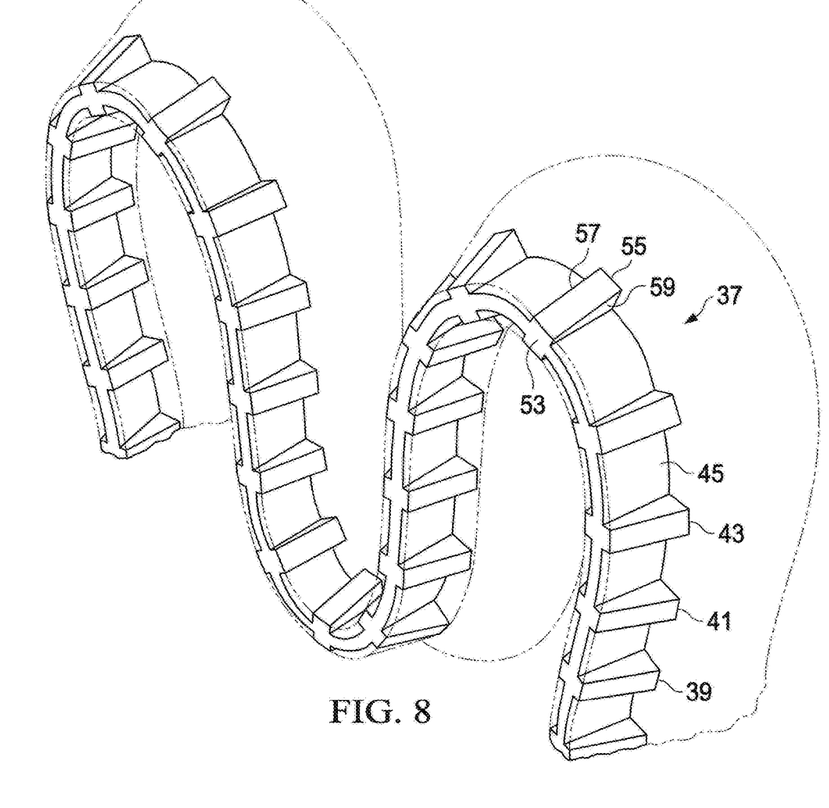
FIG. 8 is a broken away view of the hard plastic band used in the manufacture of the gasket of the invention, and illustrating the wedges which are interconnected by the flexible ribbon.
Figure 9:
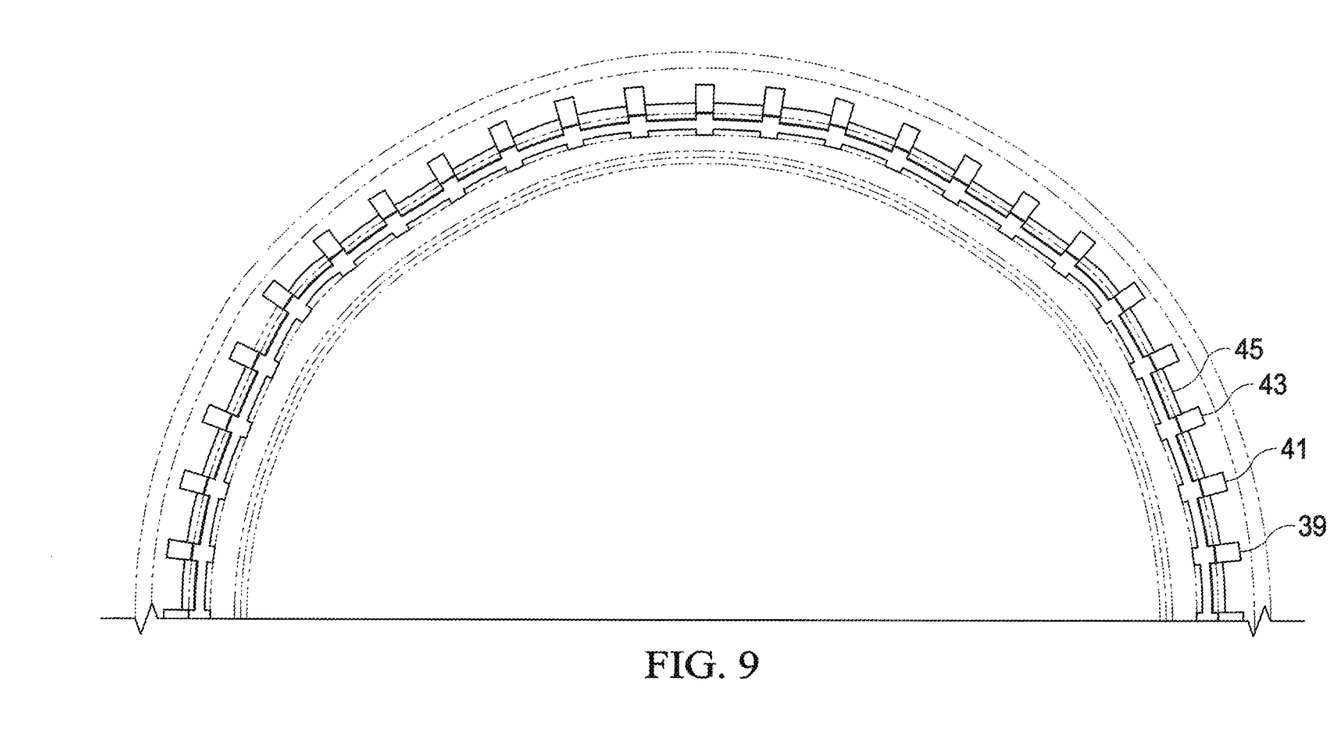
FIG. 9 is a top view of a portion of the gasket of the invention, showing the placement of the hard plastic band, the rubber portion of the gasket body being shown in phantom lines.

With reference now to FIG. 8, it will be appreciated that the leading nose region of the gasket is reinforced by a hard plastic band 37 formed as a series of integral, spaced wedges (such as wedges 39, 41, 43) interconnected by a flexible ribbon 45. As will be apparent from FIGS. 4 and 8, the wedges 39 each have a front edge 53, a rear edge 55 and opposing side edges 57, 59. The opposing side edges (such as side edge 59 in FIG. 10) slope evenly from the rear edges 55 to the front edges 53 thereof, as viewed in this cross section. FIG. 2 shows the reinforcing hard plastic band with its associated wedges in phantom lines (see, e.g., wedges 39, 41, 43). The gasket body can thus be thought of as having a rubber element and as having a hard plastic element, the hard plastic element serving as the reinforcing element for the gasket body.

During the manufacture of the gasket, the hard plastic band 37 is embedded within the leading nose region of the gasket during the gasket manufacturing operation. As will be explained in greater detail, the wedges 39 on the hard plastic band 37 act to prevent extrusion of the gasket from the raceway (13 in FIG. 1) provided in the female socket end of the thermoplastic pipe once a spigot end of a mating male pipe is installed to form a pipe joint.

As was previously mentioned, the main body portion of the gasket is formed of a natural or synthetic rubber, such as a styrene butadiene rubber, ethylene propylene diene monomer rubber or nitrile rubber. The durometer of the rubber used for the main gasket body may vary depending on the end application but will typically be in the range from about 40-70 Shore A hardness, preferably about 40-60 Shore A. The hard plastic band 37, on the other hand, is formed of a synthetic plastic material having a durometer which is greater than the durometer of the main body portion of the gasket. The synthetic plastic material used for the band is preferably a material which shows an appropriate stiffness for the application at hand while allowing flexing (accepts inverse curvature) during installation. The band can have a higher durometer than the remaining main body portion of the gasket since it does not participate in the sealing function of the gasket to the same extent as the primary sealing region of the gasket.

Various hard plastic type materials may be suitable candidates for use as the hard plastic band. These materials include such materials as polypropylene, polyvinylchloride and various "engineered plastics." For example, one such material is those hard plastics which fall into the family group of modified polyphenylene ethers (PPE). These commercially available materials have high heat resistance, making them suitable for injection or compression molding and are generally suitable for plastic/rubber composites. One commercially available family is the VESTORAN® family of materials. VESTORAN® is the registered trademark of Evonik. Degussa GmbH for molding compounds containing poly-2,6-dimethyl-1,4-phenylene ether as polymeric constituent (poly-phenylene ether, PPE, also referred to as PPO).

Figure 3:
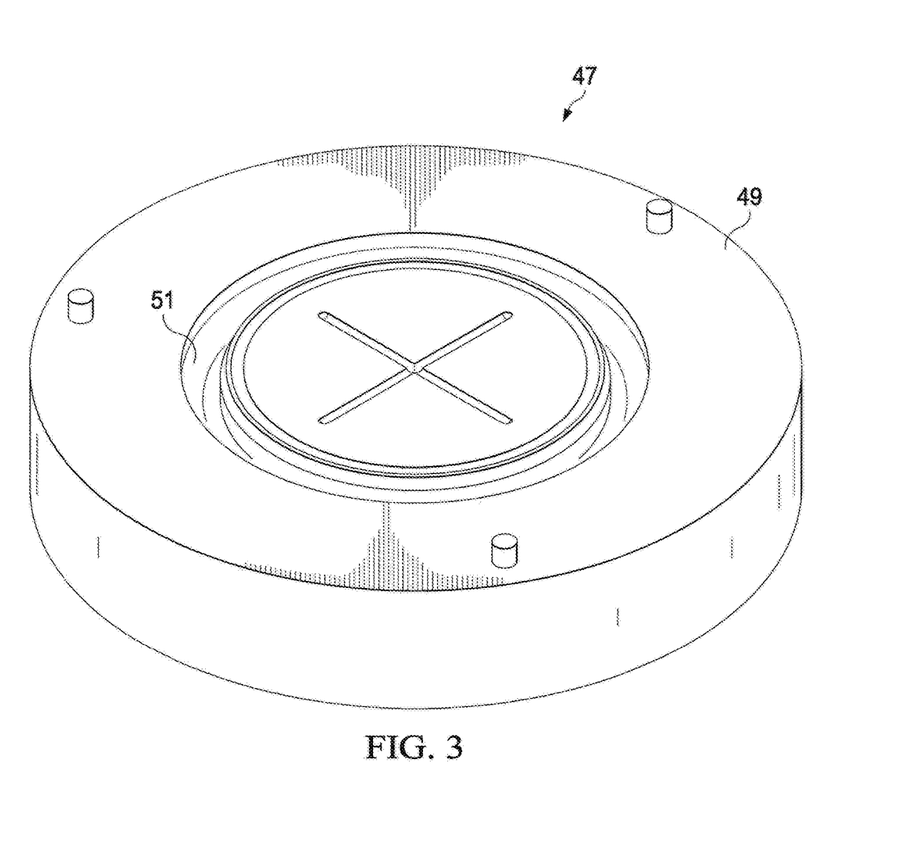
FIGS. 3-6 are simplified views of the steps of installing the hard plastic band within an, associated mold, the mold thereafter being injected with rubber and heated and cured to make the completed gasket of the invention.
Figure 4:
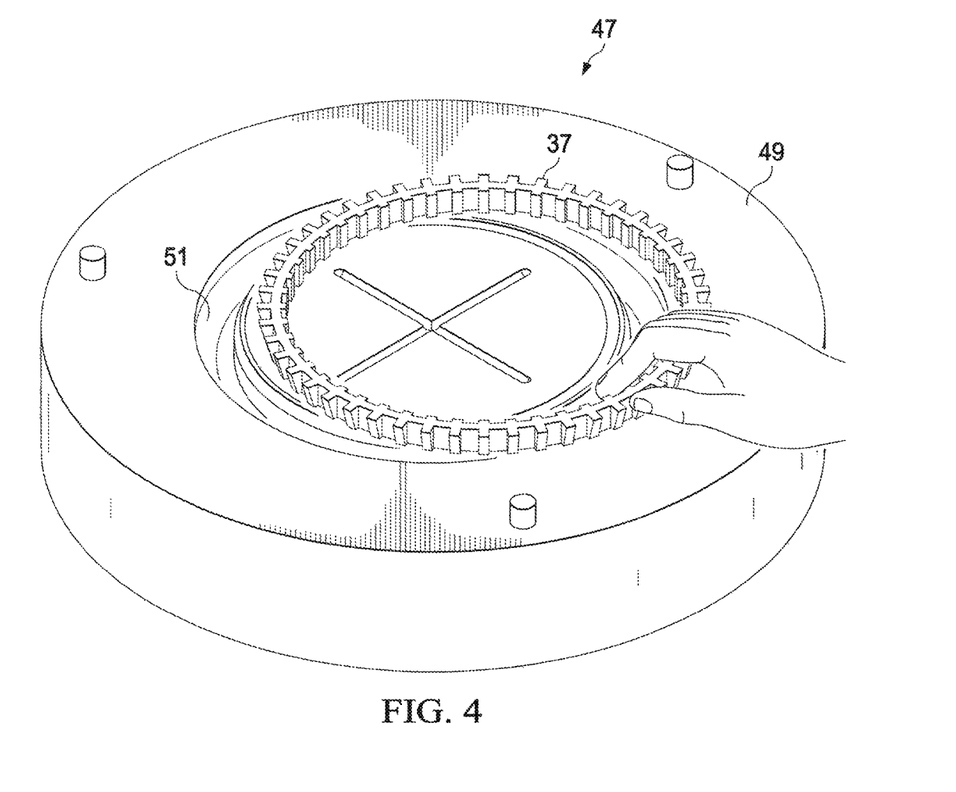

The method of manufacturing the sealing pipe gasket of the invention will now be described. The gasket is designed for receipt within a bell pipe raceway provided within a socket end of a female bell pipe member, whereby fitting the gasket within the raceway allows a mating male pipe having a spigot pipe end to be inserted therein to form a continuous pipe joint. The manufacturing method will be described primarily with respect to FIGS. 3-6. FIG. 3 shows one half of an injection molding die 47 of the type that will be familiar to those skilled in the relevant arts. As can be seen in FIG. 3, the first mold half has a first mold face 49 with a circumferential recess 51. As shown in FIG. 4, in the first step of the manufacturing process, the hard plastic band 37 with its series of integral, spaced wedges interconnected by the flexible ribbon 45 is placed within the circumferential recess 51. It will be appreciated that placing the wedges into the mold as discrete and individual elements would be very time consuming. However, because the teeth are interconnected by the flexible ribbon, they can easily be placed in the mold integrally, in a single step. This also assures the proper spacing of the individual teeth about the circumference of the gasket.

Figure 5:
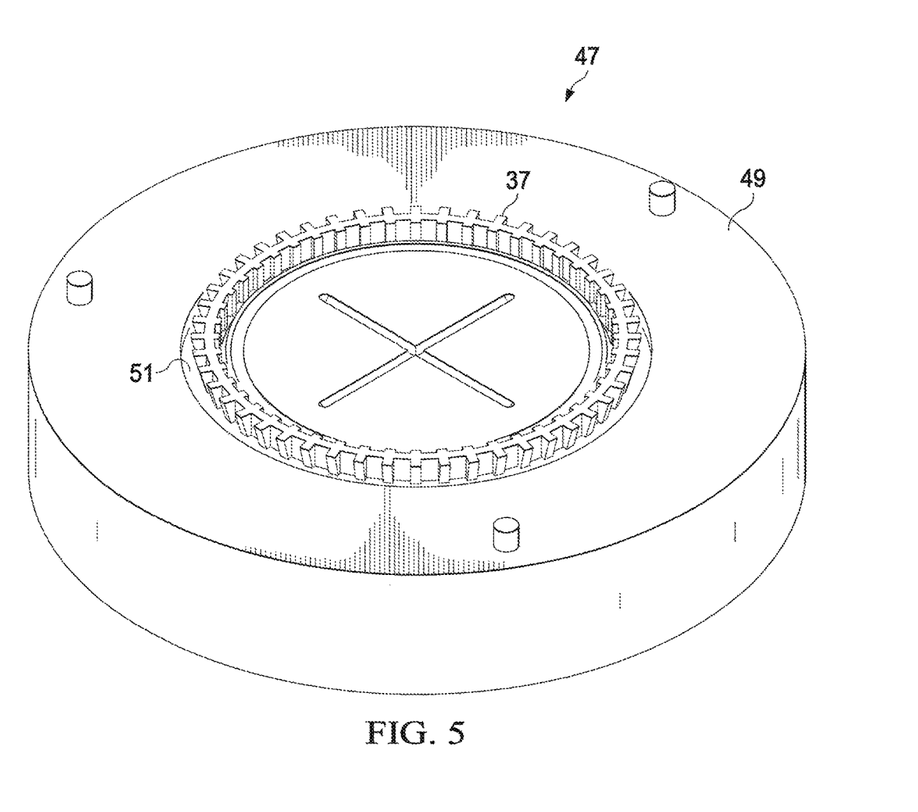
Figure 6:
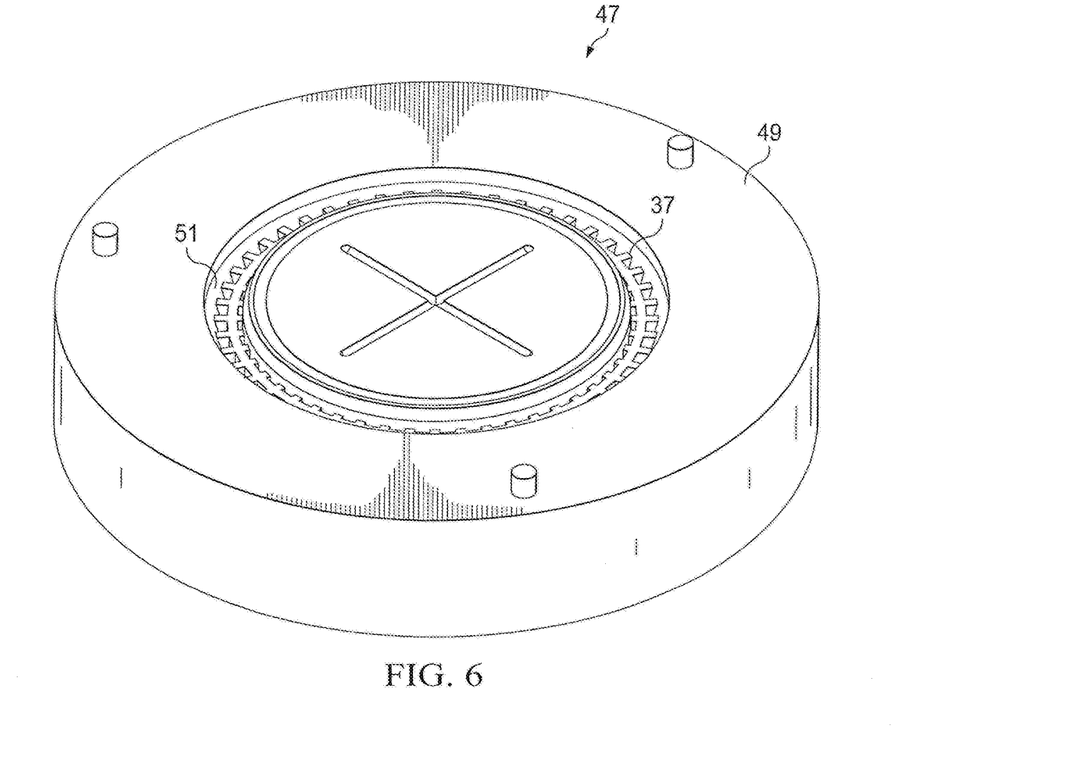

Next, there is provided a second mating mold face which is essentially a mirror image of the first mold face. FIG. 5 shows the hard plastic band partially installed in the circumferential groove of the first mold face, while FIG. 6 shows the band fully installed. The first and second mold faces are then united and the moldable rubber compound is injected into the circumferential recess. In the known manner, heat and pressure are then applied to the mold to form a ring shaped elastomeric body. The heat and pressure in the mold cures the main body portion with the hard plastic band embedded therein, whereby the main body portion of the gasket is reinforced by the hard plastic band, whereby hydraulic pressure due to fluid in the pipe acts upon the wedges on the hard plastic band to push the teeth into tighter engagement with the mating male and female pipe members to prevent extrusion of the gasket from the raceway provided in the female bell socket end of the thermoplastic pipe once a spigot end of a mating, male pipe is installed to form a pipe joint and the pipe is conveying fluid.

Figure 11:
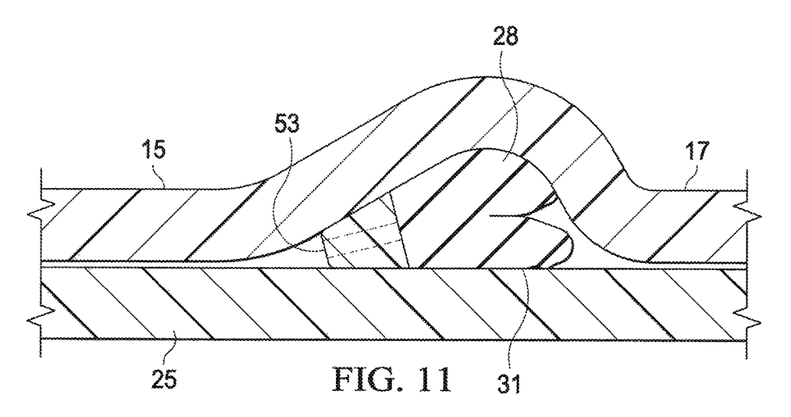
FIG. 11 is a view similar to FIG. 10, showing a completed pipe joint, with an external pressure force acting on the sealing gasket.
Figure 12:
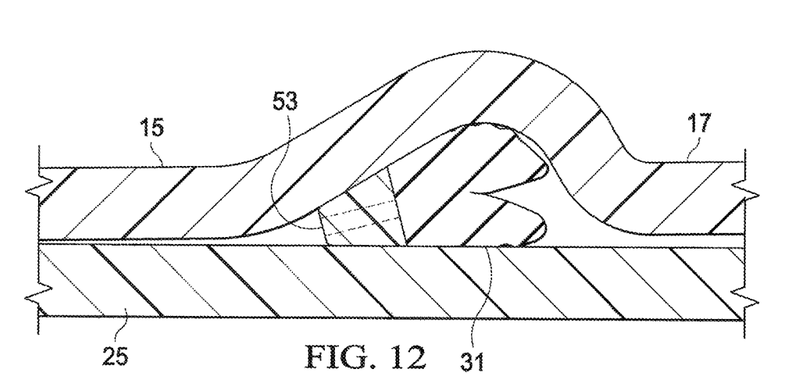
FIG. 12 is another view of the completed pipe joint, this time with the sealing gasket having an internal pressure force acting on the gasket.

While the gasket body is reinforced to prevent extrusion under various fluid pressure conditions, as well as from being displaced during field assembly, it remains flexible enough to allow the gasket to be bent by hand and installed within a gasket receiving raceway provided within the belled end of a female pipe member. The sealing gasket can be installed within the gasket receiving raceway by bending the gasket to temporarily transforms the gasket from a generally cylindrical shape to a generally elliptical shape, followed by placing the gasket within the gasket receiving groove and releasing the gasket, whereby the gasket returns to the generally cylindrical shape. Hydraulic pressure due to fluid in the pipe acts upon the wedges on the hard plastic band to push the wedges into tighter engagement with the mating male and female pipe members to prevent extrusion of the gasket from the raceway provided in the female bell socket end of the thermoplastic pipe once a spigot end of a mating male pipe is installed to form a pipe joint and the pipe is conveying fluid. FIG. 11 shows a cross section of the gasket of the invention 11 installed in a pipe joint with external pressure acting upon the gasket. FIG. 12 is a view similar to FIG. 11 but shows the cross sectional shape of the gasket where an internal fluid pressure is acting upon the gasket body.

An invention has been provided with several advantages. The method for installing a gasket of the invention allows a pipe gasket to be installed within a preexisting and preformed groove in a thermoplastic pipe. Once the gasket has been secured in position in snap-fit fashion, it is securely retained within the pipe raceway and resists axial forces tending to displace the gasket from the raceway. Because a gasket is inserted within a preformed pipe groove or raceway, the manufacturing and installation processes are simplified and made less costly. The design of the gasket also makes it possible to remove one gasket and reinstall another within a preformed raceway in the selected pipe end. The gasket which is utilized in the process is simple in design and relatively economical to manufacture. There is no need for an external retaining band or an internal metal ring to assist in securing the gasket within the pipe groove. Because the metal retaining band or ring are not necessary, it is also possible to eliminate the pins necessary to hold the band or ring in place inside the mold during manufacture, as in the previous Reiber gasket art. The hard plastic band with its integral, spaced wedges acts to prevent extrusion of the gasket from the female pipe groove under a variety of fluid pressure situations, or from being displaced during field assembly. Providing the wedges as an integral part of a continuous ribbon simplifies the manufacturing process and saves time.

While the invention has been shown in only one of its forms, it is not thus limited but is susceptible to various changes and modifications without departing from the spirit thereof.

What is claimed is:

1. A method of forming a sealed joint in a pipeline formed of sections of plastic pipe where a gasket with an embedded reinforcing hard plastic band is installed within a gasket receiving raceway provided within the belled end of a female pipe member, the raceway being arcuate with a forward facing slope region when viewed in cross section, and wherein the raceway has been previously formed during the manufacture of the pipe and the gasket is installed thereafter, the female bell socket end having a given internal diameter which is designed to receive a mating male thermoplastic pipe end to form a pipe joint, the male thermoplastic pipe end having a given outer diameter, the method comprising:

installing a sealing gasket within the gasket receiving raceway by bending the gasket to temporarily transform the gasket from a cylindrical shape to a elliptical shape, placing the gasket within the gasket receiving groove and releasing the gasket, whereby the gasket returns to the cylindrical shape;

wherein the gasket is formed as a ring shaped elastomeric body having a main body portion formed of rubber which, when viewed in cross section, includes a leading nose region, a lower compression region and a trailing tail region, the leading nose region facing towards the female socket end of the pipe once the gasket is inserted within the pipe;

wherein the leading nose region of the main body portion of the gasket is reinforced by a hard plastic band formed as a series of integral and discrete, spaced wedges interconnected by a flexible ribbon, the hard plastic band being embedded within the leading nose region of the main body portion of the gasket during gasket manufacture by molding the same therein, rather than being a separate bonded piece, the wedges each having a front edge, a rear edge and opposing side edges when viewed in isometric view, the opposing side edge of one selected wedge being connected to a side edge of a next adjacent wedge by a portion of the flexible ribbon;

wherein the hard plastic band is formed of a synthetic plastic material having a durometer which is greater than the durometer of the main body portion of the gasket while being flexible enough to allow the gasket to accept inverse curvature during installation into the groove provided in the female, socket end of the thermoplastic pipe; and wherein the wedges on the hard plastic band act in concert with the forward facing slope region of the arcuate raceway to wedge between the outer diameter of the male thermoplastic pipe end and the internal diameter of the female bell socket end, whereby hydraulic fluid due to fluid in the pipeline acts upon the wedges on the hard plastic band to push the wedges into tighter engagement with the mating male and female pipe members to prevent extrusion of the gasket from the raceway provided in the female bell socket end of the thermoplastic pipe once a spigot end of a mating male pipe is installed to from a pipe joint and the pipe is conveying fluid.

2. The method of claim 1, wherein the opposing side edges of the wedges slope evenly from the rear edge to the front edge thereof, as viewed in isometric view.

3. The method of claim 2, wherein the main body portion of the gasket is formed of a rubber selected from the group consisting of styrene butadiene rubber, ethylene propylene diene monomer rubber and nitrile rubber.

4. The method of claim 1, wherein the hard plastic band is embedded within the leading nose region of the main body portion of the gasket during manufacture by placing the hard plastic band in a mold and injecting rubber about the band, rather than being bonded as a separate piece.

5. The method of claim 1, wherein the main body portion of the gasket is formed of a natural or synthetic rubber.

6. The method of claim 1, wherein the synthetic plastic material is a modified polyphenylene ether.

7. The method of claim 1, wherein the lower compression region of the gasket includes a series of circumferential engagement grooves for engaging the mating male spigot pipe end.

8. The method of claim 1, wherein the main gasket body has an outer bulbous region which is also provided with a series of circumferential engagement grooves for engaging the female socket end of the pipe.

9. A method of installing a gasket with an embedded reinforcing hard plastic band within a gasket receiving raceway provided within the belled end of a female pipe member so as to form a sealed pipe joint in a pipeline formed of sections of plastic pipe, the belled end having a mouth opening which is engageable with a spigot end of a mating male plastic pipe section to form the pipe joint, the method comprising the steps of:

providing a plastic pipe section having a preformed female belled end opening with a gasket receiving raceway, the raceway being arcuate with a forward sloping region when viewed in cross sectional view;

installing a sealing gasket within the gasket receiving raceway by bending the gasket to temporarily transform the gasket from a cylindrical shape to a elliptical shape, placing the gasket within the gasket receiving groove and releasing the gasket, whereby the gasket returns to the cylindrical shape;

wherein the gasket is formed as a ring shaped elastomeric body having a main body portion formed of rubber which, when viewed in cross section, includes a leading nose region, a lower compression region and a trailing tail region, the leading nose region facing towards the female socket end of the pipe once the gasket is inserted within the pipe;

wherein the leading nose region of the main body portion of the gasket is reinforced by a hard plastic band formed as a series of integral, spaced wedges interconnected by a flexible ribbon, the hard plastic band being embedded within the leading nose region of the main body portion of the gasket during gasket manufacture by molding the same therein, the wedges each having a front edge a rear edge and opposing side edges, as viewed in isometric view, the opposing side edge of one selected wedge being connected to a side edge of a next adjacent wedge by a portion of the flexible ribbon; and wherein hydraulic pressure due to fluid in the pipe acts upon the wedges on the hard plastic band to push the wedges into tighter engagement with the mating male and female pipe members to prevent extrusion of the gasket from the raceway provided in the female socket end of the thermoplastic pipe once a spigot end of a mating male pipe is installed to form a pipe joint and the pipe is conveying fluid.

10. A method of installing a gasket with an embedded reinforcing hard plastic band within a gasket receiving raceway provided within the belled end of a female pipe member so as to form a sealed pipe joint in a pipeline formed of sections of plastic pipe, the belled end having a mouth opening which is engageable with a spigot end of a mating male plastic pipe section to form the pipe joint, the method comprising the steps of:

providing a plastic pipe section having a preformed female belled end opening with a gasket receiving raceway, the raceway being arcuate with a forward sloping region when viewed in cross sectional view;

installing a sealing gasket within the gasket receiving raceway by bending the gasket to temporarily transform the gasket from a cylindrical shape to a elliptical shape, placing the gasket within the gasket receiving groove and releasing the gasket, whereby the gasket returns to the cylindrical shape;

wherein the gasket is formed as a ring shaped elastomeric body having a main body portion formed of rubber which, when viewed in cross section, includes a leading nose region, a lower compression region and a trailing tail region, the leading nose region facing towards the female socket end of the pipe once the gasket is inserted within the pipe;

wherein the leading nose region of the main body portion of the gasket is reinforced by a hard plastic band formed as a series of integral, spaced wedges interconnected by a flexible ribbon, the hard plastic band being embedded within the leading nose region of the main body portion of the gasket during gasket manufacture by molding the same therein, the wedges each having a front edge a rear edge and opposing side edges, as viewed in isometric view, one of the selected wedges being connected to a next adjacent wedge by a portion of the flexible ribbon; and wherein hydraulic pressure due to fluid in the pipe acts upon the wedges on the hard plastic band to push the wedges into tighter engagement with the mating male and female pipe members to prevent extrusion of the gasket from the raceway provided in the female socket end of the thermoplastic pipe once a spigot end of a mating male pipe is installed to form a pipe joint and the pipe is conveying fluid.

* * * * *